United States Patent
Wang et al.

(10) Patent No.: US 10,841,951 B2
(45) Date of Patent: Nov. 17, 2020

(54) COMMUNICATIONS DEVICE AND METHODS THEREIN FOR PROVIDING AN IMPROVED CHANNEL ACCESS PROCEDURE

(71) Applicant: Telefonaktiebolaget LM Ericsson (publ), Stockholm (SE)

(72) Inventors: Yu Wang, Solna (SE); Guido Roland Hiertz, Aachen (DE); Anna Larmo, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 154 days.

(21) Appl. No.: 16/094,677

(22) PCT Filed: Mar. 14, 2017

(86) PCT No.: PCT/SE2017/050247
§ 371 (c)(1),
(2) Date: Oct. 18, 2018

(87) PCT Pub. No.: WO2017/196222
PCT Pub. Date: Nov. 16, 2017

(65) Prior Publication Data
US 2019/0132874 A1 May 2, 2019

Related U.S. Application Data

(60) Provisional application No. 62/335,731, filed on May 13, 2016.

(51) Int. Cl.
*H04W 74/08* (2009.01)
*H04W 72/04* (2009.01)
*H04W 84/12* (2009.01)

(52) U.S. Cl.
CPC ... *H04W 74/0816* (2013.01); *H04W 72/0446* (2013.01); *H04W 74/0808* (2013.01);
(Continued)

(58) Field of Classification Search
CPC combination set(s) only.
See application file for complete search history.

(56) References Cited

U.S. PATENT DOCUMENTS

| 8,755,281 | B2 * | 6/2014 | He | H04L 47/14 370/235 |
| 2009/0196273 | A1 * | 8/2009 | Kwon | H04W 8/30 370/343 |

(Continued)

FOREIGN PATENT DOCUMENTS

| EP | 2993953 A1 | 3/2016 |
| GB | 2423162 A | 8/2006 |
| WO | 02103943 A1 | 12/2002 |

OTHER PUBLICATIONS

Kredo, II, Kurtis, et al., "Medium access control in wireless sensor networks", ScienceDirect, Computer Networks 51, 2007, pp. 961-994.

(Continued)

*Primary Examiner* — Yee F Lam
(74) *Attorney, Agent, or Firm* — Murphy, Bilak & Homiller, PLLC

(57) ABSTRACT

A communications device (304) and a method for providing an improved channel access procedure for transmission of data. The communications device and an Access Point (AP) (302) are operating in a wireless communications network (300). The communications device performs a channel sensing procedure using a second slot counter Bn, which second slot counter is equal to a random backoff value or a first slot counter Sn. When trigger frame is received from the AP during the channel sensing procedure, which trigger frame (Continued)

triggers access to a channel, the communications device sets the first slot counter equal to the second slot counter and transmits the data to the AP on the channel. The communications device sets the first slot counter equal to a preset value and transmits the data to the AP in the absence of a received trigger frame and when the channel sensing procedure is completed.

19 Claims, 8 Drawing Sheets

(52) U.S. Cl.
  CPC ... *H04W 74/0825* (2013.01); *H04W 74/0833* (2013.01); *H04W 84/12* (2013.01)

(56) References Cited

U.S. PATENT DOCUMENTS

| | | | | |
|---|---|---|---|---|
| 2010/0135167 | A1* | 6/2010 | Ma | H04W 74/085 370/252 |
| 2010/0135319 | A1* | 6/2010 | Wang | H04W 74/0875 370/445 |
| 2011/0007703 | A1* | 1/2011 | He | H04W 74/08 370/329 |
| 2012/0127969 | A1* | 5/2012 | He | H04W 74/085 370/336 |
| 2013/0089036 | A1 | 4/2013 | Cho et al. | |
| 2013/0148501 | A1* | 6/2013 | He | H04W 74/085 370/235 |
| 2014/0294052 | A1* | 10/2014 | Currivan | H04L 27/2613 375/224 |
| 2016/0095117 | A1* | 3/2016 | Doppler | H04W 16/14 455/454 |
| 2016/0128024 | A1 | 5/2016 | Frederiks et al. | |
| 2016/0150534 | A1* | 5/2016 | Kwon | H04W 84/12 370/338 |
| 2018/0191541 | A1* | 7/2018 | Fang | H04W 74/002 |

OTHER PUBLICATIONS

Wang, Yu, et al., "Backoff Procedure Handling Upon TF Reception Name Affiliations Address Phone email", https://mentor.ieee.org/802.11/dcn/16/11-16-0583-00-00ax-backoff-procedure-handling-upon-tf-reception.pptx, May 11, 2016.

* cited by examiner

COMMUNICATIONS DEVICE AND METHODS THEREIN FOR PROVIDING AN IMPROVED CHANNEL ACCESS PROCEDURE

TECHNICAL FIELD

Embodiments herein relate generally to a communications device and to methods therein. In particular, embodiments relate to an improved channel access procedure for transmission of data, e.g. buffered data.

BACKGROUND

Communication devices such as terminals are also known as e.g. User Equipments (UEs), mobile terminals, stations (STAs), wireless devices, wireless terminals and/or mobile stations. Terminals are enabled to communicate wirelessly in a wireless communications network, such as a Wireless Local Area Network (WLAN), or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices, enabled to communicate voice and/or data, via the access network, such as a Radio Access Network (RAN), with another entity, such as an Access Point (AP), another communications device or a server.

The currently used WLAN standard, defined in the Institute of Electrical and Electronics Engineers (IEEE) 802.11ac, is based on distributed channel access through the Carrier Sense Multiple Access with Collision Avoidance (CSMA/CA) technique. A communications device that wishes to transmit must first listen to a communications medium, e.g. a channel, and keep on deferring from transmitting as long as the communications medium is assessed to be busy. Once the communications medium is found idle, the waiting communications device generates a random backoff period picked within a certain time range called a Contention Window (CW). If at the end of this backoff period the communications medium is still idle, the communications device transmits. Since multiple listeners, e.g. multiple communications devices wanting to transmit, may transmit at the same point in time after the first backoff, collisions may occur. In case of a collision, each communications device must double its contention window unless it is already at the maximum allowed value.

Uplink Multi-User Transmission in the IEEE 802.11ax Standard

In the IEEE 802.11ax standard, Multi-User (MU) transmission features including Orthogonal Frequency-Division Multiple Access (OFDMA) and Multi-User Multiple-Input and Multiple-Output (MU-MIMO) are being standardized. Different types of unicast frames may be multiplexed in the frequency domain or in the spatial domain into one MU frame. The types of frames may be data frames, control frames and management frames.

In an uplink (UL) direction, an UL MU Physical Layer Convergence (PLCP) Protocol Data Unit (PPDU) is sent from a communications device, e.g. a STA, to an Access Point (AP) as an immediate response to a Trigger Frame (TF) sent by the AP to the STA. The transmission from all the STAs in an UL MU PPDU shall end at the time indicated in the Trigger frame. The allocation of Modulation and Coding Scheme (MCS) and Resource Unit (RU) of each STA in an UL MU transmission is scheduled by the AP and indicated in the Trigger frame. The respective STA transmits an UL transmission, e.g. an UL MU PPDU, to the AP in accordance with the received trigger frame. In response to a received UL MU PPDU, the AP transmits a respective DL acknowledgement to the respective STA. The DL acknowledgements transmitted from the AP to the respective STA in response to UL MU transmissions shall be multiplexed in the frequency domain as a DL MU PPDU. The AP may poll the STAs for buffer status reports using the frame carrying the trigger info.

FIG. 1 schematically illustrates the procedure of the UL MU OFDMA transmission. As schematically illustrated, the AP gains access to the channel and transmits in the downlink a trigger frame to the STA. The STA transmits in the uplink an UL MU PPDU to the AP, which UL MU PPDU is scheduled in accordance with the received trigger frame. In response to a received UL MU PPDU, the AP transmits an acknowledgement (ACK) or a Block Acknowledgement (BA) to the STA. Further, as illustrated in FIG. 1, the trigger frame, the UL MU PPDU and the ACK/BA are transmitted during a contention-free access period of time referred to as a Transmit Opportunity (TXOP).

By scheduling UL MU transmissions, collision and UL access latency may be reduced. If UL transmissions are scheduled by the AP, the number of nodes, e.g. the number of STAs, contending for channel access will be reduced, and the collision probability is reduced with fewer contending nodes. Meanwhile, the UL MU transmissions provide UL access opportunities for multiple devices, e.g. STAs, simultaneously. Comparing to sequential access, the UL access latency may be reduced.

CSMA/CA with Random Backoff

The CSMA/CA is applied in WLAN Media Access Control (MAC) for channel access. When attempting to transmit packets, a WLAN node, such as a STA or an AP, performs clear channel assessment by sensing the physical channel. If the channel is clear for a certain period of time, e.g. during a specified Inter Frame Spacing (IFS) duration, the WLAN node, starts a random backoff process to avoid collision with other nodes.

During the random backoff process, the WLAN node chooses a random backoff number, sometimes referred to as a slot counter Bn. The random slot counter Bn is usually an integer uniformly distributed within a contention window between 0 and CW, wherein the CW is a contention window size. Once the value of the random slot counter Bn is selected, the WLAN node counts down a number of Bn slot intervals before transmitting. If the channel is sensed as busy before the end of the backoff process, the countdown freezes and the remaining time is used in the next transmission attempts.

If two WLAN nodes select the same slot counter, their transmissions will collide with each other. The collision results in failed transmission from at least one of the WLAN nodes. The collision may be detected if the WLAN node doesn't receive an ACK from another WLAN node intended as recipient of the transmission. Upon the collision detection, the WLAN node may enlarge its contention window size CW, e.g. by doubling it, to avoid future collisions. The contention window size CW is reset to a minimal value after a successful transmission.

When scheduled UL transmissions and sensing based UL channel access coexist in a communications network, the WLAN nodes, such as the AP and the STAs operating in the network, usually have equal opportunities to access a channel. Thus, the number of WLAN nodes contending for channel access is not reduced neither are the number of possible collisions which collisions may detriment the performance of the wireless communications network.

This scenario is exemplified in FIG. 2 illustrating the current STA behaviour relating to the coexistence of sensing based UL channel access and scheduled UL transmission. As shown in FIG. 2, when the STA has data in a buffer to transmit, cf. Action 201, it draws a random slot counter Bn from a contention window (CW) in Action 202. Then, in Action 203, the STA starts channel sensing. In Action 204, the STA determines whether or not it has received a Trigger Frame (TF) from the AP and whether or not it is scheduled for data transmission, e.g. scheduled for transmission of data in the buffer. If the STA has not received a TF and is not scheduled for transmission, in Action 205 the STA determines if the channel sensing is completed, i.e. when the backoff period is completed e.g. when the random slot counter Bn has been counted down to zero. If the channel sensing is not completed, the actions is repeated from Action 204. If the STA has received a TF and is scheduled to transmit data it transmits the data in Action 206 irrespective of whether or not the channel sensing is completed. If the STA has not received a TF and is not scheduled to transmit data it transmits the buffered data in Action 206 when the channel sensing is completed. In other words, if it was determined in Action 205 that the channel sensing was completed, i.e. that the backoff period was completed and the channel free to access, the STA transmits its data in Action 206.

Thus, as illustrated in FIG. 2, the STA keeps performing the sensing based channel access and the number of possible collisions, as compared to the case when only the sensing based channel access procedure is used, may not be reduced in the communications network whereby the performance of the wireless communications network is not improved with the scheduling based channel access in combination with the sensing based channel access. Since the number of possible collisions is not reduced, the number of failed transmission is not reduced resulting in a deteriorated performance of the wireless communications network.

SUMMARY

According to developments of wireless communications networks an improved channel access procedure is needed for improving the performance of the wireless communications network.

Therefore, an object of embodiments herein is to overcome the above-mentioned drawbacks among others and to improve the performance in a wireless communications network. For example, an object of embodiments herein is to provide an improved channel access procedure.

According to an aspect of embodiments herein, the object is achieved by a method performed by a communications device for providing an improved channel access procedure for transmission of data, e.g. buffered data. The communications device and an Access Point (AP) are operating in a wireless communications network.

The communications device performs a channel sensing procedure using a second slot counter Bn, which second slot counter Bn is equal to a random backoff value or a first slot counter Sn.

When a trigger frame is received from the AP during the channel sensing procedure, which trigger frame triggers access to a channel, the communications device sets the first slot counter Sn equal to the second slot counter Bn and transmits the data, e.g. the buffered data, to the AP on the channel.

Furthermore, in the absence of a received trigger frame and when the channel sensing procedure is completed, the communications device sets the first slot counter Sn equal to a preset value and transmits the data, e.g. the buffered data, to the AP.

According to another aspect of embodiments herein, the object is achieved by a communications device for providing an improved channel access procedure for transmission of data, e.g. buffered data. The communications device and an Access Point (AP) are configured to operate in a wireless communications network.

The communications device is configured to perform a channel sensing procedure using a second slot counter Bn, which second slot counter Bn is equal to a random backoff value or a first slot counter Sn.

The communications device is configured to set the first slot counter Sn equal to the second slot counter Bn and to transmit the data, e.g. the buffered data, to the AP on the channel, when a trigger frame is received from the AP during the channel sensing procedure, which trigger frame triggers access to a channel.

Furthermore, the communications device is configured to set the first slot counter Sn equal to a preset value and to transmit the data, e.g. the buffered data, to the AP, in the absence of a received trigger frame and when the channel sensing procedure is completed.

According to another aspect of embodiments herein, the object is achieved by a computer program, comprising instructions which, when executed on at least one processor, causes the at least one processor to carry out the method performed by the communications device.

According to another aspect of embodiments herein, the object is achieved by a carrier comprising the computer program, wherein the carrier is one of an electronic signal, an optical signal, a radio signal or a computer readable storage medium.

Since the communications device is configured to perform a channel sensing procedure using the second slot counter Bn, which second slot counter Bn is equal to a random backoff value or the first slot counter Sn, and since the communications device is configured to, when a trigger frame is received, restore a previously used second slot counter Bn and not to use a random backoff value, e.g. configured to set the first slot counter Sn equal to the second slot counter Bn, the likelihood that the communications device will receive a new trigger frame before counting down the second slot counter Bn in the channel sensing procedure is higher as compared to the case when the communications device selects a new random backoff value. Therefore, the transmission scheduled or triggered by the trigger frame is prioritized over channel sensing based transmissions and the number of possible collisions is reduced. This results in an improved performance in the wireless communications system.

An advantage with embodiments herein is that they provide higher priority to a scheduled UL transmission, e.g. a transmission triggered by the trigger frame, over a channel sensing based UL transmission. Thereby, the gain of UL MU transmission may be realized while providing a reduction in collisions and channel access latency.

A further advantage with embodiments herein is that they provide compatibility to legacy wireless communications network in that the communications devices not scheduled by the AP are not affected and therefore have fair opportunity for channel access through channel sensing based access.

A yet further advantage with embodiments herein is that a scheduled communications device may fall back to the legacy channel sensing based channel access if it doesn't receive a trigger frame for a period of time.

BRIEF DESCRIPTION OF DRAWINGS

Examples of embodiments herein will be described in more detail with reference to attached drawings in which.

DETAILED DESCRIPTION

Figure 1:
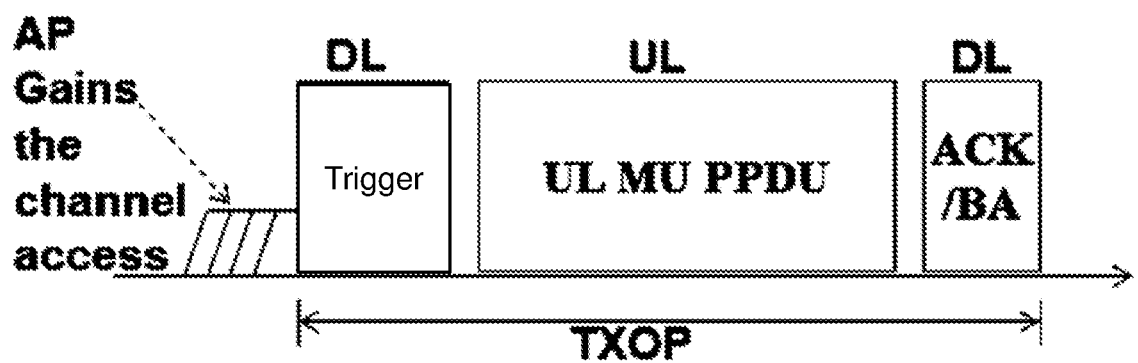
FIG. 1 schematically illustrates the procedure of an UL MU OFDMA transmission according to prior art.
Figure 2:
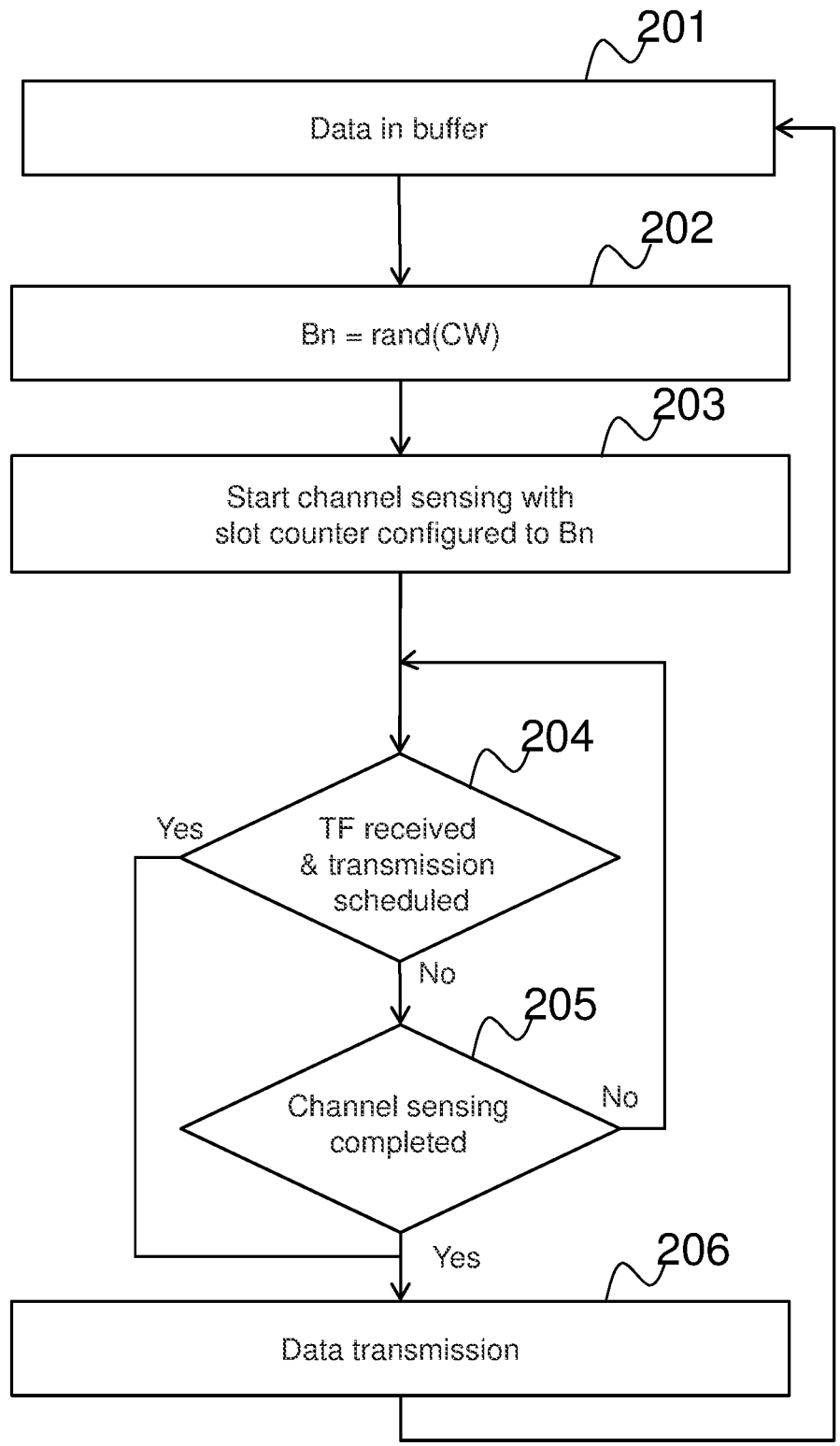
FIG. 2 schematically illustrates the STA behaviour relating to sensing based UL channel access and scheduled UL transmission according to prior art.

As part of developing embodiments herein, some problems with the state of the art communications networks will first be identified and discussed.

As mentioned above, when scheduled or triggered UL transmissions and channel sensing based UL channel access coexist in the communications network, network nodes, such as an AP and one or more communications devices, operating in the communications network, usually have equal opportunities to access a channel. Thus, the number of communications device contending for channel access is not reduced neither are the number of possible collisions which will detriment the performance of the wireless communications network.

An object addressed by embodiments herein is therefore how to improve performance in a wireless communications network.

Therefore, as mentioned above, according to embodiments herein, a way of improving the performance in the wireless communications network is provided.

Embodiments herein propose a method that provides higher transmission priority to scheduled data transmissions over channel sensing based data transmissions in the wireless communications network.

By the expressions "scheduled UL transmissions" and "scheduled data transmissions" when used in this disclosure is meant scheduled transmissions of data in for example the uplink from the communications device to the AP. The communications device receives control signaling with scheduling information, e.g. the trigger frame, and starts UL transmissions according to the received scheduling information. Further, by the expression "channel sensing based UL transmissions" when used in this disclosure is meant that the data transmissions is based on a performed channel sensing procedure. That is, the communications device performs a channel sensing procedure and starts the data transmissions, e.g. the UL transmissions, when the procedure is completed successfully.

In some embodiments, a backoff counter is restored to a previous selected random number if a trigger frame is received and data transmission is scheduled by the trigger frame. A trigger frame may refer to a frame dedicated to communicate scheduling information. A trigger frame may also refer to a data frame, a part of which contains scheduling information. In yet another embodiment, a trigger frame indicates radio resources for random access for which communication devices may compete.

Thus, embodiments herein provide an improved channel sensing in the wireless communications network when scheduled or triggered UL transmissions coexists with UL transmissions based on sensing of UL channel access. By prioritizing the scheduled or triggered UL transmissions over the channel sensing based UL transmissions, both collision reduction and UL access latency reduction may be realized. Thus, by letting the sensing based UL channel access be affected by the UL scheduling, the channel contention level may be reduced which will improve the performance in the communications network.

Note that although terminology from WLAN is used in this disclosure to exemplify the embodiments herein, this should not be seen as limiting the scope of the embodiments herein to only the aforementioned system. Other wireless systems, such as for example Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 3:
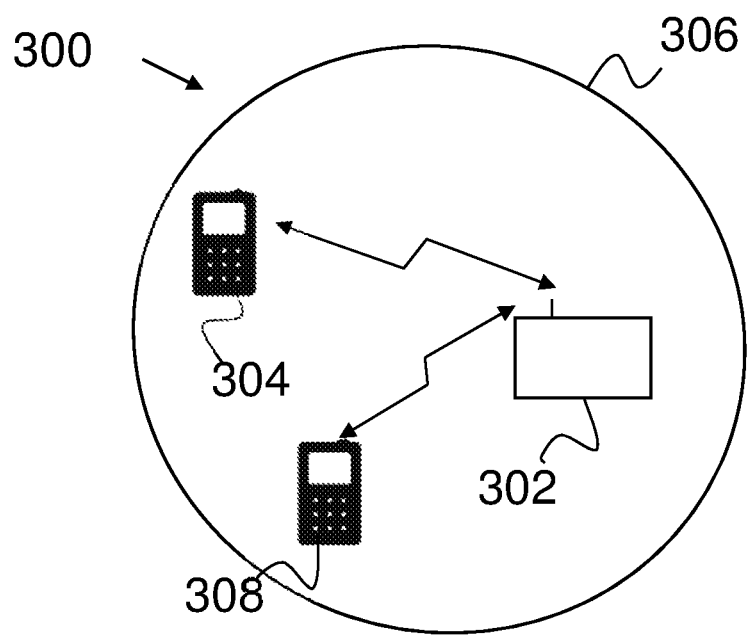
FIG. 3 is a schematic block diagram schematically illustrating embodiments of a wireless communications system.

FIG. 3 depicts an example of a communications network 300 in which embodiments herein may be implemented. The communications network 300 is a wireless communications network such as a contention based communications network, or a communications network that deploy some kind of random backoff, e.g. within a contention window, before allowing transmission when the communications network 300 has been found to be idle. However, the communications network 300 may be another type of communications network having contention-based access employing schemes that are similar to random backoff schemes. Thus, it may be a WLAN, an LTE network, a Wideband Code Division Multiple Access (WCDMA) network, a Global System for Mobile Communications (GSM) network, any 3GPP cellular network, Worldwide Interoperability for Microwave Access (WiMAX) network, any other wireless network having contention-based access employing some kind of random backoff, or a combination of one or more of the aforementioned communications networks.

An Access Point (AP) 302 operates in the communications network 300. Thus, the AP 302 is configured to operate in the communications network 300. The AP 302 may be comprised in the communications network 300.

The AP 302 may be a wireless access node, such as a WLAN access node or a radio access node. The radio access node may be a radio base station, for example an eNB, i.e. an eNodeB, or a Home Node B or any other network node capable to serve and/or communicate with a second communications device, such as a STA, in the communications network 300.

A communications device 304 operates in the communications network 300. Thus, the communications device 304 is configured to operate in the communications network 300. The communications device 304 may be any wireless device, such as an Internet of Things (IoT) device, a Low Range Low Power (LRLP) device such as a sensor, or a user equipment, just to give some examples.

In some embodiments the non-limiting term user equipment (UE) is used and it refers to any type of wireless device communicating with a network node in a communications network. Examples of wireless devices are stations (STAs), target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device, wireless device and UE are used interchangeably. Please note the term user equipment used in this document also covers other wireless devices such as Machine to Machine (M2M) devices, even though they do not have any user.

The AP 302 and the communications device 304 is sometimes in this disclosure referred to as network nodes, e.g. a first network node and a second network node.

Further, the AP 302 and the communications device 304 are configured for wireless communication with each other when being located within a geographical area 306 served by one of the nodes, e.g. the AP 302, having radio coverage within the geographical area 306. Herein, this is also specified as the AP 302 manages or is configured to manage communication with the communications device 304 in the geographical area 306. The geographical area 306 may be determined as the area where communication between the network nodes are possible, given one or more constraints on, e.g., output power, required data rate and similar. In this disclosure, the geographical area 306 is sometimes also referred to as a coverage area, a cell or a cluster.

Further, it should be understood that one or more further communications devices 308 may be operating in the communications network 300, and configured to communicate with the AP 302 and/or the communications device 304 within the geographical area 306. The one or more further communications devices 308 may be any wireless devices, such as one or more IoT devices, one or more LRLP devices such as one or more sensors, one or more user equipment or a combination thereof, just to give some examples. One or more communications devices 304, 308 may be said to belong to the same Basic Serving Set (BSS) when operating within the geographical area 306.

Figure 4:
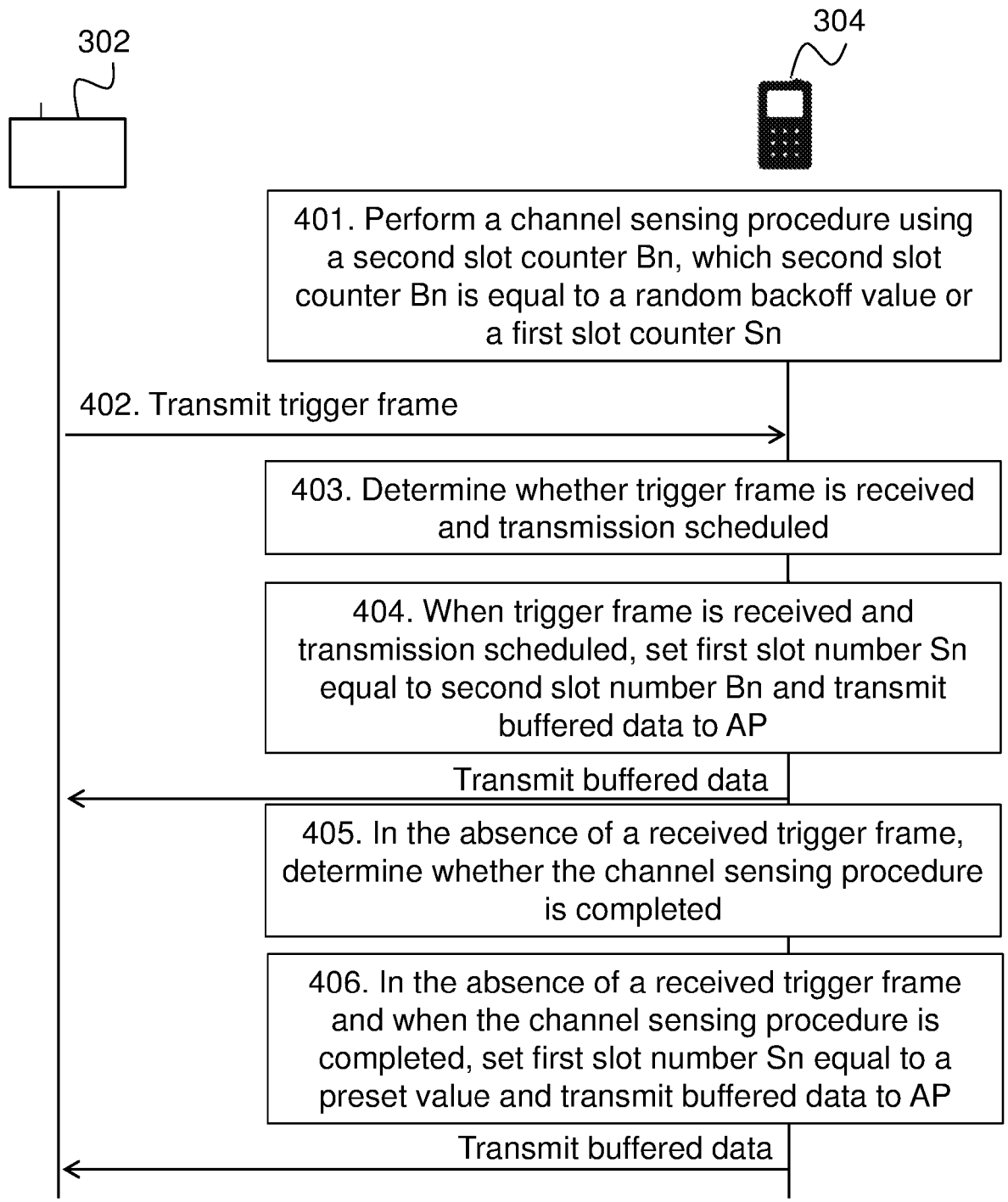
FIG. 4 is a combined flowchart and signaling scheme schematically illustrating embodiments of a method performed in a wireless communications network.

FIG. 4 is a schematic combined flowchart and signaling scheme of embodiments of the communications network 300. As previously mentioned, the AP 302 and the communications device 304 are configured to operate in the communications network 300. The wireless device 304 is configured to perform both scheduled or triggered transmissions and channel sensing based transmissions.

It should be understood that the channel sensing procedure may be started when data is predicted to be received for further transmission. Thus, the procedure may be started and one or more of the actions below may be performed before data is buffered.

Action 401

The communications device 304 performs a channel sensing procedure using a second slot counter Bn, which second slot counter Bn is equal to a random backoff value or a first slot counter Sn. The first slot counter Sn is a preset value, such as −1, which is used as an initial value. The second slot counter Bn is equal to a random backoff value when the first slot counter Sn is equal to −1. Thus, when the first slot counter Sn is equal to the initial value, the communications device 304 performs the channel sensing procedure using a randomly selected backoff value, otherwise it uses the first slot counter Sn.

The channel sensing procedure using the random backoff value may for example be a CSMA/Collision Detection (CD) or a CSMA/CA procedure, or another contention based access procedure.

By the expression "contention based access procedure" when used in this disclosure is meant a procedure where multiple communication devices, e.g. the communications device 304 and the one or more further communications device 308, attempt to capture a communications medium. Some examples of contention procedures are the CSMA/CA procedure, a CSMA/CD procedure, and a procedure comprising contention for subbands which may be followed by a special trigger from the AP, e.g. the AP 302.

This relates to Actions 506 which will be described in more detail below.

Action 402

The AP 302 transmits a trigger frame to the communications device 304. The trigger frame triggers the communications device 304 to access a channel, and to transmit data, e.g. buffered data. In other words, the trigger frame triggers the communications device 304 to transmit the data, e.g. the buffered data. This may also be expressed as the trigger frame triggers transmission and that the transmission is triggered. It should be understood that the triggered transmission may be scheduled, but it does not have to be scheduled.

By the term "channel" when used herein is meant a physical medium for communication between one or several transmitters and one or several receivers. For example, the channel may be a radio channel such as a radio carrier. The transmitter and the receiver may be network nodes operating in the communications network. The physical medium for communication is sometimes in this disclosure referred to as the communications medium.

Action 403

The communications device 304 determines whether or not a trigger frame (TF), e.g. a first trigger frame, is received from the AP 302 and whether or not transmission is scheduled or triggered, e.g. whether or not transmission of data, e.g. buffered data, is scheduled or triggered. As previously described, the trigger frame triggers the communications device 304 to access a channel, and to transmit data, e.g. buffered data. Thus, the trigger frame may be said to trigger transmission of data. This may be the case even when the transmission of data is not scheduled.

It should be understood that the data may be buffered data or unbuffered data. For example, the unbuffered data may relate to or comprise one or more system frames such as a buffer status report that may be generated after the reception of the trigger frame. Thus, the data does not have to be buffered but it should be data to be transmitted. This data is sometimes in this disclosure referred to as a data transmission or just to as a transmission. Therefore, the terms data, buffered data, data transmission, and transmission may be used interchangeably herein.

A trigger frame may refer to a frame dedicated to communicate scheduling information. A trigger frame may also refer to a data frame, a part of which may comprise scheduling information. In yet another embodiment, a trigger frame indicates radio resources for random access for which communication devices, e.g. the communications device 304, may compete.

The trigger frame may be received from the AP 302 during the channel sensing procedure.

This relates to Action 507 which will be described in more detail below.

Action 404

When the trigger frame is received and transmission is scheduled or triggered, the communications device 304 sets the first slot counter Sn equal to the second slot counter Bn and transmits the data, e.g. the buffered data, to the AP 302.

Thus, when the trigger frame is received from the AP 302 during the channel sensing procedure and when the transmission is scheduled or triggered, the communications device 304 sets the first slot counter Sn equal to the second slot counter Bn and transmits the data, e.g. the buffered data, to the AP 302.

By setting the first slot counter Sn equal to the second slot counter Bn, the first slot counter will be used as input value to a new channel sensing procedure when there exist more data in the buffer to be transmitted. That is, when there is more data to be transmitted the actions will be repeated using the first slot counter as input value to the channel sensing procedure.

This relates to Actions 509 and 511 which will be described in more detail below.

Action 405

In the absence of a received trigger frame, the communications device 304 determines whether or not the channel sensing procedure is completed.

This relates to Action 508 which will be described in more detail below.

In the absence of a received trigger frame and if the channel sensing procedure is not completed, the communications device 304 will continue to determine whether or not a trigger frame is received from the AP 302 and whether or not transmission is scheduled or triggered. This is schematically illustrated in FIG. 5 by the loop from Action 508 to Action 507.

Action 406

In the absence of a received trigger frame and when the channel sensing procedure is completed, the communications device 304 sets the first slot counter Sn equal to the preset value, e.g. −1, and transmits the data, e.g. the buffered data, to the AP 302.

By setting the first slot counter Sn equal to the preset value, e.g. to the initial value, a randomly selected backoff value will be used as input value to a new channel sensing procedure when there exist more data in the buffer to be transmitted. That is, when there is more data to be transmitted the actions will be repeated using the randomly selected backoff value as input value to the channel sensing procedure.

This relates to Actions 510 and 511 which will be described in more detail below.

As will be described below, one or more of the actions described above may be repeated as long as there is data to be transmitted in a buffer of the communications device 304.

Figure 5A:
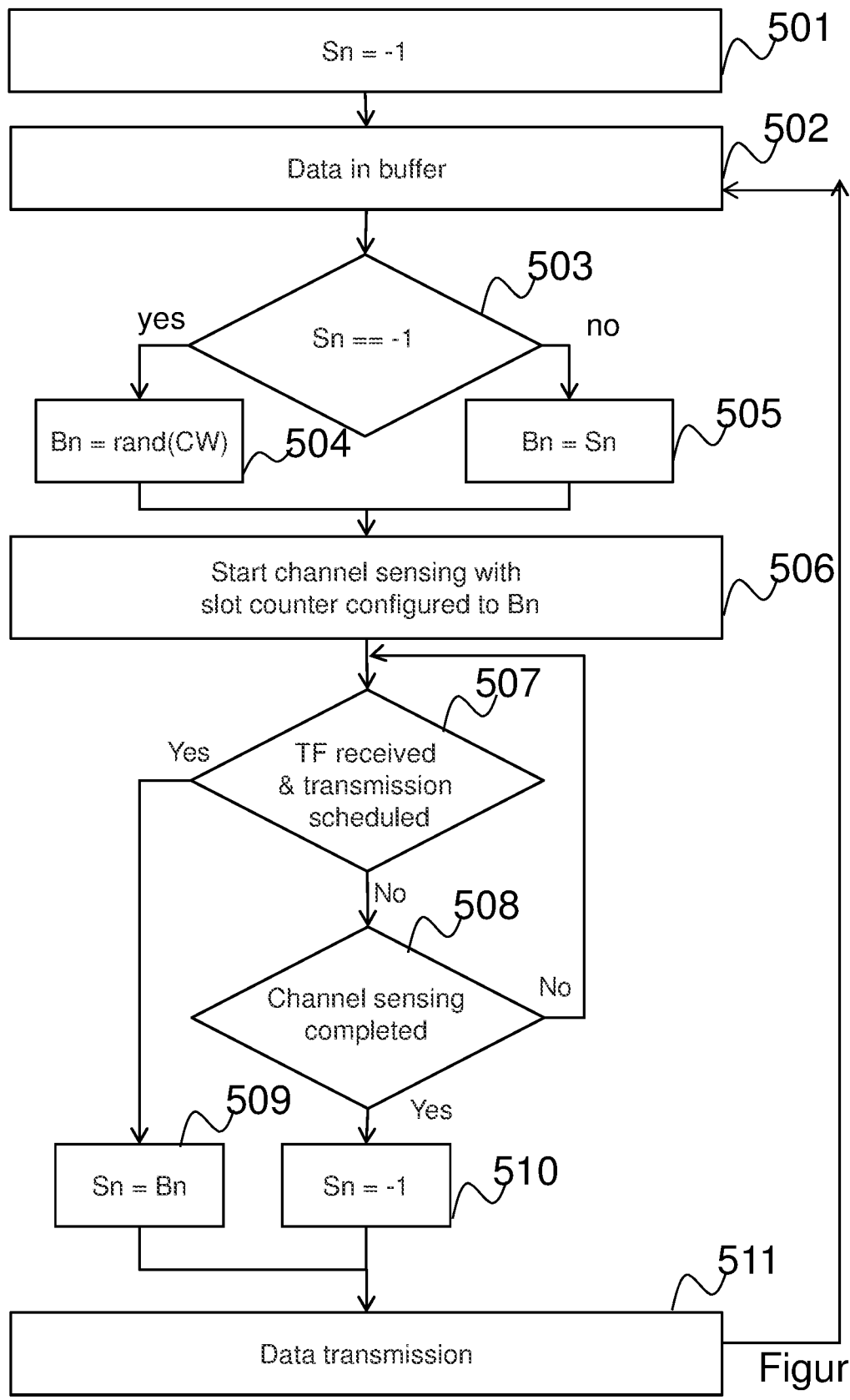
FIG. 5A is a flowchart depicting embodiments of a method performed by a communications device.
Figure 5B:
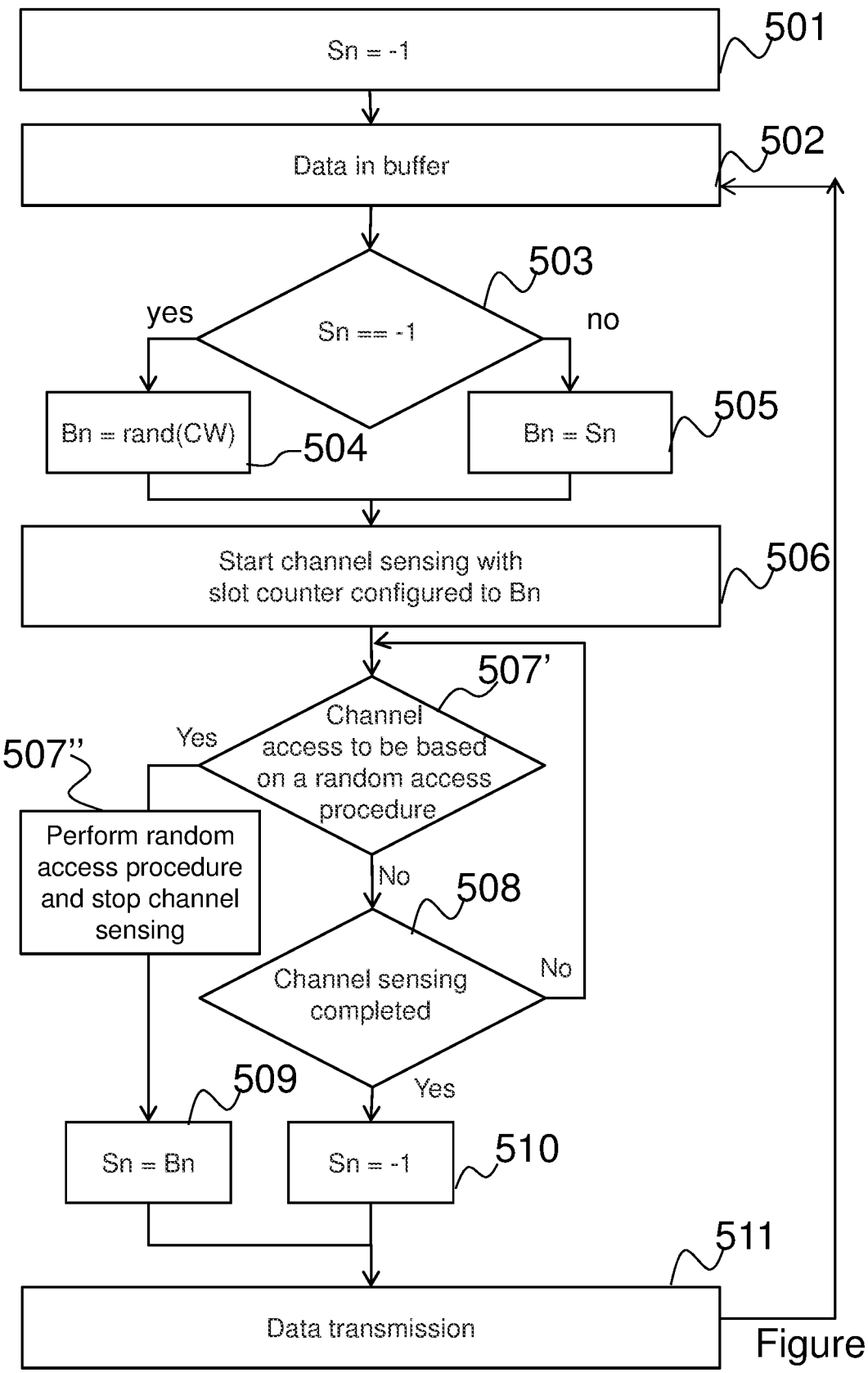
FIG. 5B is a flowchart depicting embodiments of a method performed by a communications device.

Examples of methods performed by the communications device 304 for providing an improved channel access procedure for transmission of data, e.g. buffered data, will now be described with reference to the flowchart depicted in FIGS. 5A and 5B. As previously mentioned, the AP 302 and the communications device 304 are operating in the communications network 300. As also previously mentioned, the wireless device 304 is configured to perform both scheduled or triggered transmissions and sensing based transmissions.

The methods comprise one or more of the following actions. It should be understood that these actions may be taken in any suitable order and that some actions may be combined.

Action 501

The communications device 304 sets a first slot counter Sn to an initial value, e.g. to −1. It should be understood that the first slot counter Sn may be initialized to another value than −1, as long as it is a low number, e.g. a number less than 0 since 0 is the lowest possible value generated in Action 504 below, i.e. the lowest possible random value that may be used as a random second slot counter Bn. In other words, the communications device 304 sets the first slot counter Sn equal to the initial value being less than the lowest possible random backoff value. Thus, it should be understood that the value −1 is given here just as an example.

Action 502

The communications device 304 has data in a buffer which data is to be transmitted. Thus, in Action 502 the communications device 304 determines that it has data to transmit.

Action 503

The communications device 304 determines whether or not the first slot counter Sn is equal to the initial value, e.g. −1. This is done in order to determine whether or not a random value is to be used as a second slot counter Bn, e.g. a as backoff value, in the channel sensing procedure.

Action 504

If the first slot counter Sn is equal to the initial value, e.g. −1, the communications device 304 selects, e.g. draws, the random second slot counter Bn and stores it. The second slot counter Bn is randomly selected within a contention window between 0 and CW, wherein CW is the contention window size. Thus, when the first slot counter Sn is equal to the initial value, e.g. −1, the communications device 304 sets the second slot counter Bn equal to the random backoff value.

Action 505

If the first slot counter Sn is not equal to the initial value, e.g. −1, the communications device 304 sets the second slot counter Bn to be equal to the first slot counter Sn. For example, this may be the case when scheduled or triggered data has been transmitted during a first channel sensing procedure and when there is still data in the buffer to be transmitted during a second sensing procedure or after completion of the first sensing procedure.

Action 506

The communications device 304 starts channel sensing using the second slot counter Bn.

Action 507

The communications device 304 determines whether or not it has received a trigger frame and whether or not it is scheduled for transmission of the data, e.g. the buffered data. In other words, the communications device 304 determines whether or not the trigger frame has been received and whether or not transmission is scheduled or triggered.

Action 508

If the communications device 304 in Action 507 determines that it has not received the trigger frame and that no transmission is scheduled or triggered, the communications device 304 determines whether the channel sensing is completed.

Thus, in the absence of the trigger frame and of scheduled or triggered transmission, the communications device 304 determines whether or not channel sensing is completed.

Action 509

As previously mentioned, If the communications device 304 has received the trigger frame and if it is scheduled or triggered for transmission, the communications device 304 sets the first slot counter Sn equal to the second slot counter Bn. As will be described in Action 511 below, data will be transmitted, and if the buffer comprises more data to be transmitted, the first slot counter Sn being set equal to the second slot counter Bn will be used as the second slot counter Bn for the second channel sensing procedure, cf. Actions 511, 502, 503, 505, 506, etc. Thereby, it is achieved that first slot counter Sn, having a value that is statistically small, will be used as the total number of slot counts in the second channel sensing procedure instead of a new random number which statistically has a higher probability to be larger than the first slot counter Sn.

Action 510

When the backoff procedure is completed, i.e. when the backoff time period has ended, the communications device 304 sets the first slot counter Sn equal to −1 and starts its transmission of the buffered data in Action 511. If the buffer comprises more data to be transmitted, the first slot counter Sn being set equal to −1 will be used to determine that the second slot counter Bn should be set equal to a random backoff value for a second channel sensing procedure, cf. Actions 511, 502, 503, 504, 506, etc.

Action 511

The communications device 304 transmits the data.

After the transmission is completed in Action 511, the procedure will be repeated from Action 502 with the first slot counter Sn equal to the second slot counter Bn or to the preset value, e.g. −1, if there is more data in the buffer to transmit and a new sensing procedure is started.

Some embodiments herein apply to the case where the data buffer of the communications device 304 is not emptied after the scheduled or triggered transmission. If the data buffer is emptied after the scheduled or triggered transmission, the communications device 304 may not receive a new trigger frame from the AP 302. In this case, the communications device 304 may simply reset the sensing process as described above.

As an alternative, a period of time or a timer, e.g. a Timer_reuse, may be associated with the restored second slot counter Bn as described in the Actions 509 and 505 above. When the data buffer of the communications device 304 is emptied after the UL transmission, the period of time or timer, e.g. the Timer_reuse, is started. If no data arrives in the data buffer before the period of time or timer expires, the restored value of the second slot counter Bn will be discarded and a new random slot counter, e.g. a new second slot counter Bn, will be drawn for the next transmission. In other words, the restored value of the second slot counter Bn will be discarded, and the first slot counter Sn may be set to the initial value, e.g. −1. The purpose of the timer is to regulate a period for the effectiveness of some embodiments.

If the backoff process is completed and no trigger frame is received, a new random number, e.g. a new second slot counter Bn, will be drawn for the next transmission, cf. Action 504 above.

It should be noticed that when a trigger frame is received before the backoff process is completed, the AP 302 must have drawn a smaller random number than the communications device 304 since the second slot counter of the AP 302 was counted down to zero before the second slot counter of the communications device 304. According to some embodiments, the relatively large random number drawn by the communications device 304 will be reused for the next transmission. This gives a higher probability that the random slot counter drawn by the AP 302 will be smaller than the one used by the communications device 304. Thus, the AP 302 will access the communications medium before the channel sensing procedure of the communications device 304 has ended, and consequently, the AP 302 will transmit the trigger frame to the communications device 304 before the channel sensing procedure of the communications device 304 has ended and the communications device 204 has transmitted its buffered data. Thereby, the trigger frame will trigger the communications device 304 to transmit its buffered data before the channel sensing procedure has been completed. Therefore, the UL MU transmission is prioritized over the sensing based transmission by some embodiments disclosed herein.

In some other embodiments, instead of being scheduled or triggered by the trigger frame, the communications device 304 may receive a trigger frame indicating free resources for random access. If the communications device 304 performs the random access and accesses the channel by the random access procedure, the second slot counter Bn is assigned to the first slot counter Sn and the sensing process is stopped followed by data transmission. In such embodiments, the Action 507 described above will be replaced by an Action 507', cf. FIG. 5B, in which Action 507' the communications device 304 determines whether channel access it to be based on a random access procedure, and if so, in Action 507" the communications device 304 performs a random access procedure to access the channel and stops the sensing process. In Action 511 the data is transmitted.

EXAMPLE

For example, at a point of time t0, both the communications device 304 and the AP 302 sense a radio channel as free after a previous transmission and both initialize a channel sensing procedure by drawing a respective random backoff number, e.g. a respective second slot counter Bn. In this example, the AP 302 draws a random second slot counter Bn'(1) being equal to 2 and the communications device 304 draws a random second slot counter Bn(1) being equal to 5. When the AP 302 has counted down its second slot counter Bn'(1) to zero it will transmit a trigger frame towards the communications device 304 to schedule or trigger an UL transmission of the communications device 304. Thus, after 2 slot durations (one slot=9 µs in the WLAN), the AP 302 transmits the trigger frame towards the communications device 304 to schedule or trigger the UL transmission. When the communications device 304 detects the trigger frame, it will sense the channel as busy and stop counting down the backoff timer, i.e. its second slot counter Bn(1), with 3 (5-2) remaining slots. After being scheduled or triggered, the communications device 304 will not redraw a new random number for the next transmission but reuse the previous second slot counter Bn, e.g. Bn(2)=Bn(1)=5. This will not guarantee that the random number drawn by the AP 302, e.g. its second slot counter, Bn'(2) is smaller than the communications device's second slot counter Bn(2)=5. However, given the fact Bn(2)=Bn(1)>Bn'(1), the probability of Bn(2) being larger than Bn'(2) is higher as compared to the prior art comprising the drawing of a new random number for Bn(2). It means stochastically that the AP 302 has higher chance to access the channel than the communications device 304, hence the centralized scheduling or triggering with the trigger frame is prioritized over the distributed channel access. In other words, UL transmissions triggered or scheduled by a centralized node, such as an AP, e.g. the AP 306, are prioritized over UL transmissions based on a channel sensing procedure performed by the communications device 304.

Figure 6:
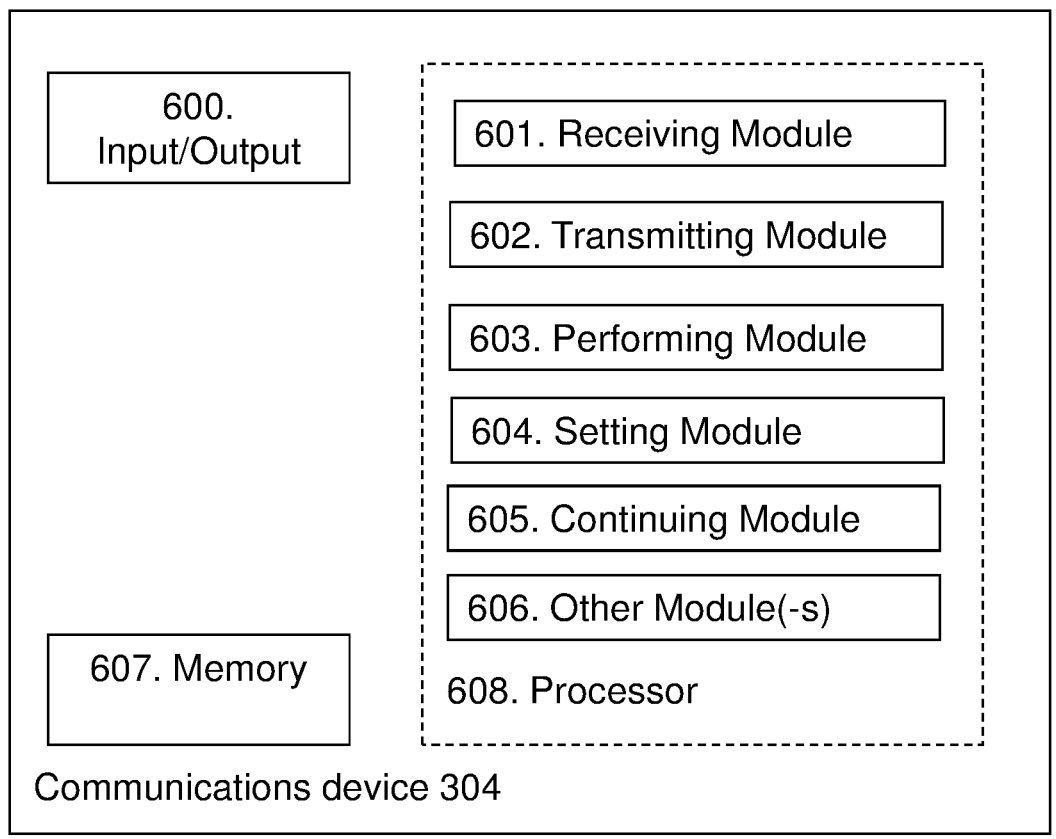
FIG. 6 is a schematic block diagram illustrating embodiments of a communications device.

To perform the method for providing an improved channel access procedure for transmission of data, the communications device 304 may be configured according to an arrangement depicted in FIG. 6. As previously perform the mentioned, the AP 302 and the communications device 304 are configured to operate in the wireless communications network 300.

The communications device 304 comprises an input and output interface 600 configured to communicate the AP 302. The input and output interface 600 may comprise a wireless receiver (not shown) and a wireless transmitter (not shown).

The communications device 304 is configured to receive, e.g. by means of a receiving module 601 configured to receive, a transmission from the AP 302. The receiving module 601 may be implemented by or arranged in communication with a processor 608 of the communications device 304. The processor 608 will be described in more detail below.

The communications device 304 is configured to receive, from the AP 302, a trigger frame. The trigger frame triggers the communications device 304 to access a channel.

The communications device 304 is configured to transmit, e.g. by means of a transmitting module 602 configured to transmit, a transmission to the AP 302. The transmitting module 602 may be implemented by or arranged in communication with the processor 608 of the communications device 304.

The communications device 304 is configured to transmit, to the AP 302, a transmission, e.g. data such buffered data or unbuffered data. The communications device 304 may perform the transmission on a channel based on the trigger frame.

The communications device 204 may be configured to perform, e.g. by means of a performing module 603 configured to perform, a channel sensing procedure. The performing module 603 may be implemented by or arranged in communication with the processor 608 of the communications device 204.

The communications device 304 is configured to perform a channel sensing procedure using the second slot counter Bn, which second slot counter Bn is equal to a random backoff value or the first slot counter Sn.

Further, the communications device 304 may be configured to perform a random access procedure to obtain channel access.

The communications device 304 is configured to set, e.g. by means of a setting module 604 configured to set, the first and second slot counters Sn and Bn. The setting module 604 may be implemented by or arranged in communication with the processor 608 of the communications device 304.

The communications device 204 may be configured to continue, e.g. by means of a continuing module 605 configured to continue, performing one or more of the actions described herein. The performing module 604 may be implemented by or arranged in communication with the processor 608 of the communications device 304.

The communications device 304 is configured to continue the performing of the actions as long as there is data to be transmitted, e.g. data to be transmitted in the buffer. For example the communications device 304 may continue to perform channel sensing using a new random backoff time, e.g. a new second slot counter Bn based on a new first slot counter Sn. This may be the case when the communications device 304 has transmitted buffered data to the AP 302.

The communications device 304 may be configured to perform other actions and features described herein, e.g. by means of one or more other modules 606 configured to perform one or more other actions, steps and features described herein. The other module(-s) 606 may be implemented by or arranged in communication with the processor 608 of the communications device 304.

The communications device 304 may also comprise means for storing data, e.g. to buffer data to be transmitted. In some embodiments, the communications device 304 comprises a memory 607 configured to store the data. The data may be processed or non-processed data and/or information relating thereto. The memory 607 may comprise one or more memory units. Further, the memory 607 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the communications device 304.

Embodiments herein for providing an improved channel access procedure may be implemented through one or more processors, such as the processor 608 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the communications device 304. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the communications device 304.

Those skilled in the art will also appreciate that the input/output interface 600, the receiving module 601, the transmitting module 602, the performing module 603, the stopping module 604, the continuing module 605 and the other module(-s) 606 above may refer to a combination of analog and digital circuits, and/or one or more processors configured with software and/or firmware, e.g. stored in the memory 607, that when executed by the one or more processors such as the processor in the communications device 304 perform as described in this disclosure. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 7:
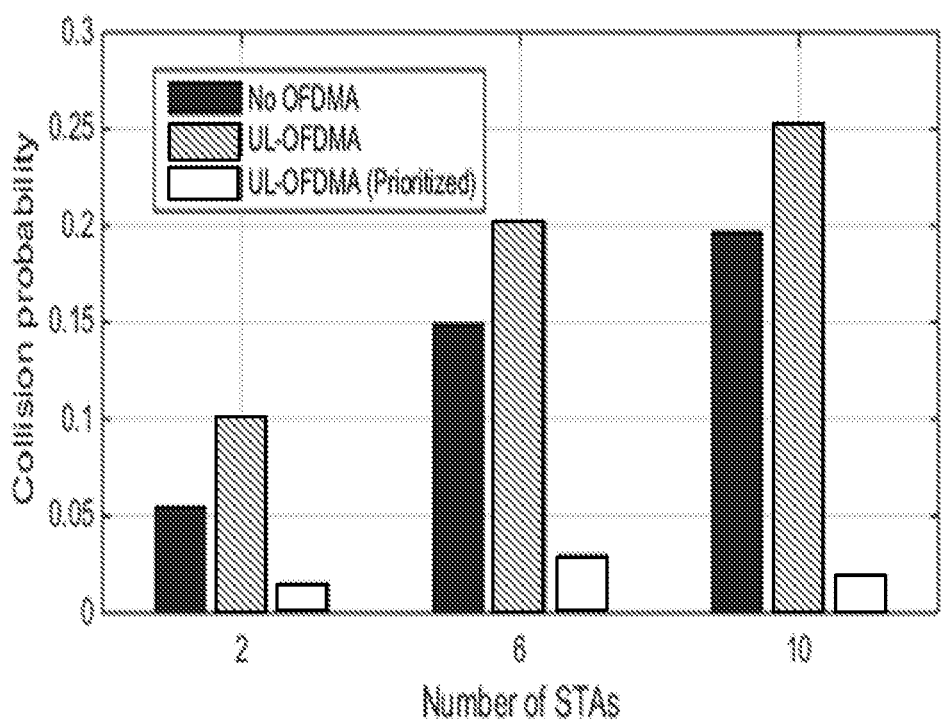
FIG. 7 is a schematic diagram schematically showing the reduced collision probability achieved by some embodiments.

FIG. 7 is a diagram schematically showing a reduced collision probability achieved by some embodiments. The reduced collision probability shown is based on simulation results. The simulation scenario contains one AP, e.g. the AP 302, and two to ten communications device, e.g. the communications device 304 and one or more further communications devices 308, with full buffer uplink traffic. As schematically illustrated the collision probability obtained by some embodiments disclosed herein and denoted as UL-OFDMA prioritized in FIG. 7 is less than 5%.

When using the word "comprise" or "comprising" it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a communications device, operating with an Access Point (AP) in a wireless communications network, for providing an improved channel access procedure for transmission of data, the method comprising:

determining whether or not a first slot counter (Sn) is equal to an initial value that is less than a minimum backoff value;

when the first slot counter (Sn) is equal to the initial value, setting the second slot counter (Bn) equal to a randomly selected backoff value;

when the first slot counter (Sn) is different from the initial value, setting the second slot counter (Bn) equal to the first slot counter (Sn);

performing a channel sensing procedure using the second slot counter (Bn) set equal to the randomly selected backoff value or the first slot counter (Sn);

when a trigger frame, which triggers access to the channel by the device, is received from the AP during the channel sensing procedure, setting the first slot counter (Sn) equal to the second slot counter (Bn) and transmitting the data to the AP via the channel without waiting for completion of the channel sensing procedure; and when the channel sensing procedure is completed without receiving a trigger frame from the AP, setting the first slot counter (Sn) equal to a preset value and transmitting the data to the AP.

2. The method of claim 1, wherein the trigger frame schedules the communications device for channel access.

3. The method of claim 1, wherein the trigger frame allocates radio resources for random channel access and wherein the method further comprises:

using the allocated radio resources, performing a random access procedure to obtain channel access.

4. The method of claim 1, wherein the method further comprises setting the first slot counter (Sn) equal to the initial value.

5. The method of claim 1, further comprising:

during the channel sensing procedure, determining whether or not the trigger frame has been received and whether or not the device has been scheduled or triggered for transmission of the data.

6. The method of claim 5, further comprising:

when is determined that the trigger frame has not been received and that the device has not been scheduled or triggered for transmission of the data, determining whether or not the channel sensing procedure is completed.

7. The method of claim 1, wherein the preset value is less than the minimum backoff value.

8. The method of claim 1, wherein the channel sensing procedure is one of the following:

a Carrier Sense Multiple Access (CSMA) with Collision Avoidance (CSMA/CA) procedure;

a CSMA Collision Detection (CSMA/CD) procedure; and a contention-based access procedure.

9. The method of claim 1, wherein the data comprises buffered data.

10. A communications device for providing an improved channel access procedure for transmission of data, wherein the communications device and an Access Point (AP) are configured to operate in a wireless communications network, and wherein the communications device comprises:

a communications interface configured to communicate with the AP;

at least one processor operably coupled to the communications interface; and at least one memory storing computer-executable instructions that, when executed by the at least one processor, configure the communications device to:

determine whether or not a first slot counter (Sn) is equal to an initial value that is less than a minimum backoff value;

when the first slot counter (Sn) is equal to the initial value, set the second slot counter (Bn) equal to a randomly selected backoff value;

when the first slot counter (Sn) is different from the initial value, set the second slot counter (Bn) equal to the first slot counter (Sn);

perform a channel sensing procedure using the second slot counter (Bn) set equal to the randomly selected backoff value or the first slot counter (Sn);

when a trigger frame, which triggers access to the channel by the device, is received from the AP during the channel sensing procedure, set the first slot counter (Sn) equal to the second slot counter (Bn) and transmit the data to the AP via the channel without waiting for completion of the channel sensing procedure; and when the channel sensing procedure is completed without receiving a trigger frame from the AP, set the first slot counter (Sn) equal to a preset value and transmit the data to the AP.

11. The communications device of claim 10, wherein the trigger frame schedules the communications device for channel access.

12. The communications device of claim 10, wherein the trigger frame allocates radio resources for random channel access and wherein execution of the instructions further configures the communications device to perform a random access procedure to obtain channel access using the allocated radio resources.

13. The communications device of claim 10, wherein execution of the instructions further configures the communications device to set the first slot counter (Sn) equal to the initial value.

14. The communications device of claim 10, wherein execution of the instructions further configures the communications device to:

during the channel sensing procedure, determine whether or not the trigger frame has been received and whether or not the device has been scheduled or triggered for transmission of the data.

15. The communications device of claim 10, wherein when it is determined that the trigger frame has not been received and that the device has not been scheduled or triggered for transmission of the data, execution of the instructions further configures the communications device to determine whether or not the channel sensing procedure is completed.

16. The communications device of claim 10, wherein the preset value is less than the minimum random value.

17. The communications device of claim 10, wherein the channel sensing procedure is one of the following:

a Carrier Sense Multiple Access (CSMA) with Collision Avoidance (CSMA/CA) procedure;

a CSMA Collision Detection (CSMA/CD) procedure; and a contention-based access procedure.

18. A non-transitory, computer-readable medium storing computer-executable instructions that, when executed on at least one processor comprising a communication device, configures the communication device to:

determine whether or not a first slot counter (Sn) is equal to an initial value that is less than a minimum backoff value;

when the first slot counter (Sn) is equal to the initial value, set the second slot counter (Bn) equal to a randomly selected backoff value;

when the first slot counter (Sn) is different from the initial value, set the second slot counter (Bn) equal to the first slot counter (Sn);

perform a channel sensing procedure using the second slot counter (Bn) set equal to the randomly selected backoff value or the first slot counter (Sn);

when a trigger frame, which triggers access to the channel by the device, is received from the AP during the channel sensing procedure, set the first slot counter (Sn) equal to the second slot counter (Bn) and transmit the data to the AP via the channel without waiting for completion of the channel sensing procedure; and when the channel sensing procedure is completed without receiving a trigger frame from the AP, set the first slot counter (Sn) equal to a preset value and transmit the data to the AP.

19. The non-transitory, computer-readable medium of claim 18, wherein the preset value is less than the minimum backoff value.

* * * * *